Aug. 27, 1929.    L. L. JONES    1,725,960
SOLDER REPLENISHER
Filed May 2, 1927
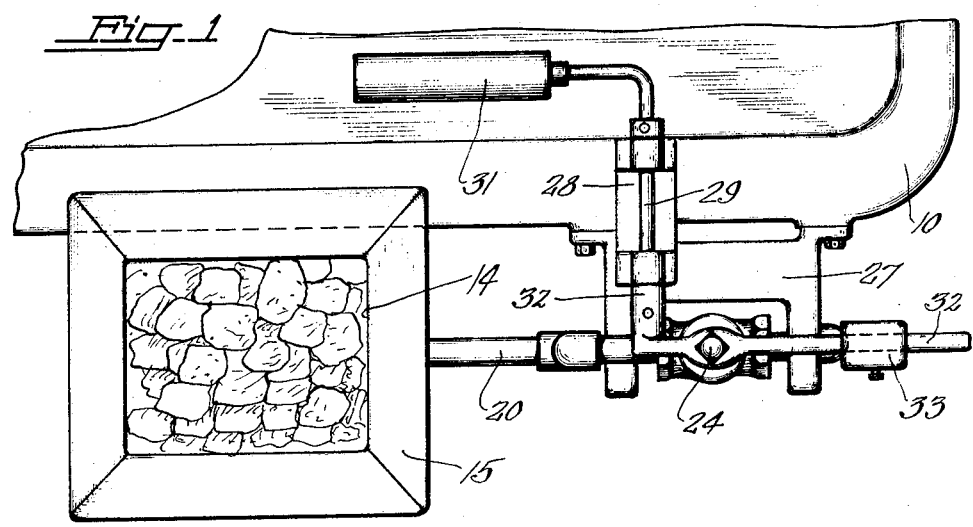
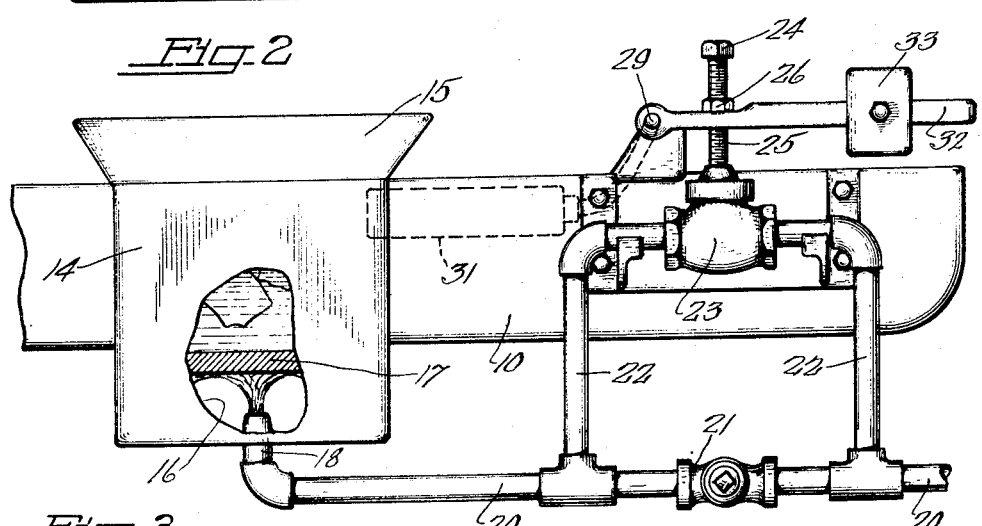
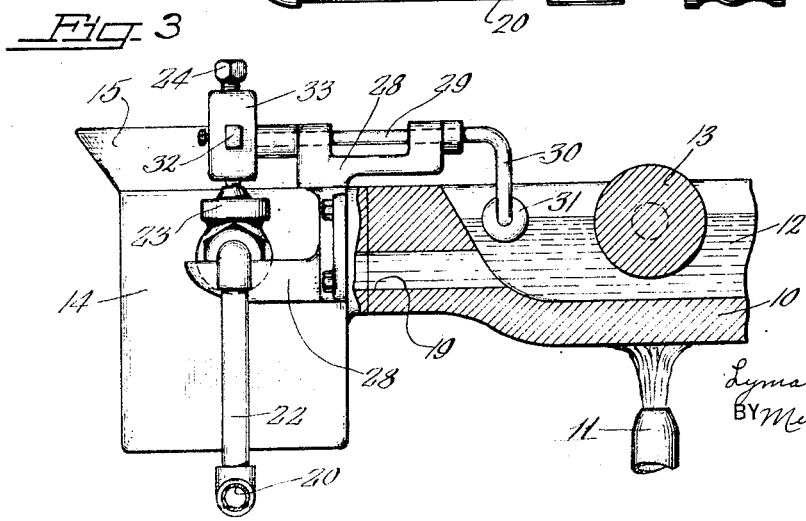
INVENTOR
Lyman L. Jones
BY Munday, Clarke &
Carpenter
ATTORNEYS Patented Aug. 27, 1929.

1,725,960

UNITED STATES PATENT OFFICE.

LYMAN L. JONES, OF SEATTLE, WASHINGTON, ASSIGNOR TO AMERICAN CAN COMPANY, OF NEW YORK, N. Y., A CORPORATION OF NEW JERSEY.

SOLDER REPLENISHER.

Application filed May 2, 1927. Serial No. 188,380.

This invention relates in general to the maintenance of a constant level of the solder in a can seamer solder bath, although it may be used wherever applicable.

The principal object of the invention is to provide an auxiliary small heater into which solid solder may be placed, as in a hopper, and heat applied automatically thereto, depending upon the level of the solder in the main solder bath, with which the auxiliary heater is connected.

A further important object of the invention is to maintain a constant level of solder in the solder bath without altering the heat regulation of the main solder receptacle and without the addition thereto of solid pieces of unmelted solder, which tend to cool the molten mass of solder and to require that more heat be applied thereto than is actually necessary.

A further important object is the provision of means for adding bar solder to a solder bath through an auxiliary feeder, which is connected to the solder bath below the upper level of solder in the bath, so that a large portion of the surface impurities are kept from the main solder receptacle.

Numerous other objects of the invention will be apparent as it is better understood from the following description, which, taken in connection with the accompanying drawings, discloses a preferred embodiment thereof.

In the accompanying drawing:

Figure 1 is a plan view of a portion of a solder bath to which this invention is applied;

Fig. 2 is a side elevation with part of the auxiliary heater broken away, illustrating the invention; and Fig. 3 is an end view illustrating the invention, some of the parts being shown in section.

When solder in a cold or solid state is added to a molten bath of its metal, the entire body of solder in the bath must be heated an additional amount sufficient to reduce the added stock to a liquid state, thereby not only resulting in a great loss of heat, but also in many cases heating the bath or body of solder to a higher degree than is necessary. This invention overcomes these objections by providing an auxiliary or smaller receptacle to which heat is automatically applied for melting or reducing the bar or solid stock to a liquid state only as required, thus heating only the added stock to the required degree and not heating the larger body of molten liquid to a degree higher than is necessary.

Referring more particularly to the drawings; a main solder receptacle 10 is heated in the usual or ordinary way by a burner 11 to maintain a body of solder 12 in a liquid state where it may be used, for example, by a can soldering roll 13.

Attached to one side of the receptacle 10 is a smaller auxiliary receptacle 14 having a hopper top 15 and a depending flange 16 extending below its bottom 17, which receives heat from a burner 18. The connected sides of the receptacles 10 and 14 have a submerged passage 19 forming communication therebetween below the normal level of the molten metal 12 in the main receptacle 10 for the passage of liquid solder, whereby the dross formed in the replenisher 14 is kept from the solder roll 13.

A piping connection 20 has a hand valve 21 therein for manually controlling the supply of fuel to the burner 18 with a by-pass connection 22 extending around the valve 21, in which is a valve 23 controlled by a valve member 24 movable vertically in the valve body, having a threaded stem 25 and an engagement nut 26 movable thereon, the stem being vertically movable for variation of the amount of fuel admitted through the valve 23, and the nut 26 being variable to control the solder level in the receptacle 10.

As shown in the drawings, the fuel piping connection for the burner 18 is supported by a forked bracket 27 secured at the side of the main receptacle 10 and having an inwardly extending yoke 28 in which a rod 29 is journalled. This rod 29 has a bent arm 30 extending into the receptacle 10 which carries a float 31 adapted to be raised and lowered by the variation of the molten liquid 12 in the receptacle 10. To the other end of the rod 29 an arm 32 is fixed, which carries an adjustable counterweight 33 and through which extends the stem 25 of the valve operating member 24, engaging the nut 26 to raise the stem which falls by gravity or by a spring, not shown.

When this apparatus is in operation, it is necessary only to add solder in solid form at the upper end of the auxiliary receptacle 14, which is heated by the burner 18, the fuel supply to this burner being regulated by the float 31, so that the valve 23 admits more fuel to the burner as the float drops by raising the valve member 24. This adds more heat to the auxiliary receptacle 14 which melts more of the solder, which may be in solid form, thereby causing an additional supply of molten solder to be added to the receptacle 10 through the passage 19. The reverse action of the float allows the valve member 24 to fall, cutting off some of the fuel supply to the burner 18 and thus reducing the amount of heat supplied and the amount of solder melted.

In starting the operation of the solder bath, when the metal therein has become solidified, the hand valve 21 is operated for admitting a larger amount of fuel to the burner 18, for reducing the contents of the auxiliary receptacle to a molten condition. As soon as the metal in the main receptacle 10 is liquefied, the float 31 will be operative to control the auxiliary receptacle.

It may appear that the placing of a quantity of solid or cold solder in the auxiliary melting pot 14 would only result in this material being immediately reduced to a liquid state. As a matter of fact, this does not occur, as the solid pieces of solder are of the same specific gravity as the molten liquid and a great amount of heat must be applied by the burner 18 to melt more of the cold solder therein. In its natural operation, the auxiliary melting pot usually contains a considerable amount of unmelted solder deposited in the hopper top thereof, and the operation of the auxiliary melting pot is not influenced by the quantity of solder that is placed therein. By introducing the additional solder through the communicating passage 19 below the level of the solder in the main receptacle, a great amount of the scum or impurities of the added solder is kept from the main receptacle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a solder-applying roll, a heated solder bath, an auxiliary replenishing receptacle having a passage communicating with the bath below the normal surface of solder therein, and means regulated by the top level of the melted solder in said bath and receptacle for varying the heat applied to the auxiliary receptacle.

2. The combination of a solder-applying roll, a heated solder receptacle, a smaller solder heating receptacle having a passage communicating therewith below the normal level of solder in the main receptacle, means for applying heat to the smaller receptacle, and means for automatically maintaining a constant level of solder in the main receptacle, comprising a float and a valve controlled thereby for varying the heat applied to the smaller receptacle.

3. The combination of a solder-applying roll, a heated solder receptacle, an auxiliary replenishing receptacle connected therewith below the normal level of solder in the first receptacle, the auxiliary receptacle comprising a hopper for receiving solder in solid form above the level of the liquid solder, and means for variably applying heat to the auxiliary receptacle, depending upon the amount of solder required in the main receptacle, to keep the level of solder constant therein.

4. The combination of a solder-applying roll, a constantly heated receptacle for liquid solder, an auxiliary, variably heated, receptacle connected with the other receptacle, a heat controlling means for the auxiliary receptacle, comprising a valved fuel supply line, and float controlled operating means for the valve.

5. The combination with a constantly heated solder receptacle and a solder roll rotatable therein of a variably heated smaller replenishing receptacle, having a communicating connection therewith below the normal level of heated solder in the main receptacle, the smaller receptacle having upwardly extending sides for supporting solid solder therein above the level of the solder in the main receptacle, said solder roll withdrawing the solder from the main receptacle, and automatic float controlled means for varying the supply of heat to the smaller receptacle depending upon the amount of solder withdrawn from the main receptacle.

6. The combination with a continuously heated main receptacle for containing molten solder, of a solder roll operating therein, a smaller replenishing receptacle having a connection with the main receptacle below the normal level of solder therein, the smaller receptacle having upwardly extending hopper sides for receiving and holding solid solder above liquid solder contained therein, and means for automatically varying the heat applied to the auxiliary receptacle, depending upon the level of solder in the main receptacle, to melt more or less of the solid solder contained in the auxiliary receptacle and thereby equalize the supply of fresh solder with the amount thereof constantly withdrawn by said roll.

7. A solder replenisher for a solder heating bath, comprising in combination a receptacle with a hopper top and protecting sides depending below the bottom thereof, and having an intermediate lateral opening for connection with said solder bath, means arranged within said depending sides for heating said receptacle, and means for controlling the fuel supplied to the said heating means comprising a fuel pipe line with a hand controlling valve and a by-pass around the hand valve, which includes an adjustable valve, and means for controlling the valve, said means including a float and an arm in in connection therewith for engaging the valve.

8. The combination with a heated solder bath of a rotary solder-applying roll in said bath, an auxiliary replenishing receptacle having direct communication with the bath, whereby solder may pass by continuous circulation from the solid or unmolten state into the molten state and thence into the solder bath without interruption and as rapidly as solder is removed by said roll.

9. The combination of a solder bath, a solder-applying roll rotary in the same and arranged to have its under part submerged in the melted solder, a replenisher adapted to melt solder to be supplied gradually by gravity flow to said bath, and a conduit for the melted solder leading from below the surface of the solder in the replenisher to said bath, whereby dross formed in the replenisher is kept from said bath, and means for regulating the application of heat to said replenisher according to the height of the melted solder level.

10. The combination of a solder bath, a solder-applying roll rotary in the same and arranged to have its under part submerged in the melted solder, a replenisher adapted to melt solder to be supplied gradually by gravity flow to said bath, a conduit for the melted solder leading from below the surface of the solder in the replenisher to said bath, said replenisher and bath having means whereby dross formed in the replenisher is kept from said bath.

LYMAN L. JONES.